(12) United States Patent
Zhang et al.

(10) Patent No.: US 12,727,052 B2
(45) Date of Patent: Sep. 1, 2026

(54) MANAGEMENT OF DIRECT WIRELESS LINK ESTABLISHMENT BY D2D COMMUNICATION DEVICES

(71) Applicant: Telefonaktiebolaget LM Ericsson (publ), Stockholm (SE)

(72) Inventors: Congchi Zhang, Shanghai (CN); Jose Angel Leon Calvo, Aachen (DE); Shehzad Ali Ashraf, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 501 days.

(21) Appl. No.: 17/916,841

(22) PCT Filed: Apr. 7, 2020

(86) PCT No.: PCT/EP2020/059918
§ 371 (c)(1),
(2) Date: Oct. 4, 2022

(87) PCT Pub. No.: WO2021/204368
PCT Pub. Date: Oct. 14, 2021

(65) Prior Publication Data

US 2023/0139318 A1 May 4, 2023

(51) Int. Cl.
*H04W 76/23* (2018.01)
*H04W 40/24* (2009.01)
*H04W 76/14* (2018.01)
*H04W 88/04* (2009.01)

(52) U.S. Cl.
CPC ......... *H04W 76/23* (2018.02); *H04W 40/248* (2013.01); *H04W 76/14* (2018.02); *H04W 88/04* (2013.01)

(58) Field of Classification Search
CPC .... H04W 76/23; H04W 76/14; H04W 40/248
See application file for complete search history.

(56) References Cited

U.S. PATENT DOCUMENTS

2004/0153520 A1* 8/2004 Rune .................... H04W 92/20 709/206
2008/0002640 A1* 1/2008 Westphal ............. H04W 40/02 370/338
2008/0009241 A1* 1/2008 Do ........................ H04B 7/155 455/9

(Continued)

OTHER PUBLICATIONS

3GPP, “3rd Generation Partnership Project; Technical Specification Group Radio Access Network; NR; Study on NR Vehicle-to-Everything (V2X) (Release 16)”, 3GPP TR 38.885 V16.0.0, Mar. 2019, 1-122.

*Primary Examiner* — Kevin M Cunningham
(74) *Attorney, Agent, or Firm* — Murphy, Bilak & Homiller, PLLC

(57) ABSTRACT

A D2D communication device (10) receives a D2D communication message transmitted on a direct wireless link (21) from a first other D2D communication device (10) to a second other D2D communication device (10). The D2D communication message comprises at least one identifier of the first other D2D communication device. Based on the at least one identifier, the D2D communication device controls establishment of a direct wireless link (22) between the D2D communication device (10) and the first other D2D communication device (10).

5 Claims, 10 Drawing Sheets

(56) References Cited

U.S. PATENT DOCUMENTS

2009/0268634 A1 10/2009 Mashimo
2015/0365285 A1* 12/2015 Phillips .................. H04L 43/16 370/254
2017/0111780 A1 4/2017 Rico Alvarino et al.
2018/0152353 A1* 5/2018 Bergström .............. H04L 45/24
2020/0322868 A1* 10/2020 Claffey ................... H04L 45/48
2021/0409320 A1* 12/2021 Wang .................... H04L 45/025
2024/0056377 A1* 2/2024 Magnezi ............. H04L 43/0888

* cited by examiner

MANAGEMENT OF DIRECT WIRELESS LINK ESTABLISHMENT BY D2D COMMUNICATION DEVICES

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019-03). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

For NR sidelink communication, unicast at access stratum is supported for services requiring high reliability. Between the same UE pair, there can be multiple sidelink unicast links and each link can support multiple SL QoS flows/radio bearers, established via a sidelink radio interface, in the NR and LTE technology referred to as "PC5". At the access stratum, each link can be identified by the source and destination Layer 2 identity (L2 ID). FIG. 1A schematically illustrates utilization of multiple sidelink unicast links between two UEs for supporting multiple different services.

The sidelink unicast link can be established by means of a direct discovery procedure. In this procedure, an initiating UE who intends to communicate with a specific UE or another UE supporting a specific service will broadcast a Direct Communication Request message. If a specific target UE is known to the initiating UE, the initiating UE includes a higher layer identifier of the target UE in the Direct Communication Request message. This case is also referred to as "UE oriented Layer-2 link establishment". If the initiating UE would like to discover all UEs in proximity having interest in the same service, the Direct Communication Request message may include a service identifier instead of the identifier of a specific target UE. This is also referred to as "service oriented Layer-2 link establishment". A UE in proximity which receives the Direct Communication Request will respond to the initiating UE only if it is the identified target UE or if it has interest in the identified service. The link is then established after L2 ID exchange and a security setup procedure. FIG. 1B schematically illustrates an example of a direct discovery procedure for service-oriented Layer-2 link establishment.

A further potential use case of D2D communication is NSPS (National Security and Public Safety). In traditional specific NSPS communication systems such as TETRA (Terrestrial Trunked Radio), data rates are in the order of a few kbit/s at most, which is regarded to be not sufficient to support future NSPS use case scenarios. Moreover, the NSPS use case requires enhanced coverage and high reliability of communication. Some scenarios of the NSPS use case also involve operation without support from infrastructure, e.g., NSPS communication in tunnels, inside certain buildings, or in certain emergency situations where the infrastructure is destroyed or non-operative. Even though in some of these situations, cellular coverage could be provided using mobile base stations, e.g., trucks with a portable base station, basing at least a part of NSPS communication on LTE or NR sidelink communication can provide benefits concerning the achievable data rates, robustness, and reliability of operation without network coverage. In the case of NR sidelink communication, also NSPS group communication scenarios can be efficiently addressed, such as communication among a group of workers in a building or at an emergency site. In some scenarios, also utilization of multi-hop wireless connections formed of multiple sidelink unicast links could help to enable communication between devices which are not capable of establishing a direct sidelink unicast connection.

When using a multi-hop wireless connection formed of multiple sidelink unicast links, a first UE would be communicating with a second UE via one or more relay UEs. Due to the mobility of the UEs, at some point the first UE and the second UE may get close to each other, so that in principle direct sidelink communication would be possible. This may however require constant monitoring of the availability of the direct sidelink communication by regularly broadcasting a Direct Communication Request message and/or by monitoring Direct Communication Request messages broadcasted by other UEs. This may result in excessive signaling overhead and high power consumption. The latter is specifically undesirable in the case of low-energy UEs. Moreover, the direct discovery mechanism does not take into consideration whether there are reasonable chances of successfully establishing the direct sidelink communication. Accordingly, the UE will broadcast the Direct Communication Request messages regardless of the surrounding UEs. This may result in excessive signaling load, in particular in scenarios with a high density of UEs.

Accordingly, there is a need for techniques which allow for efficiently managing direct wireless links between D2D communication devices.

SUMMARY

According to an embodiment, a method of controlling device-to-device communication is provided. According to the method, a D2D communication device receives a D2D communication message transmitted on a direct wireless link from a first other D2D communication device to a second other D2D communication device. The D2D communication message comprises at least one identifier of the first other D2D communication device. Based on the at least one identifier, the D2D communication device controls establishment of a direct wireless link between the D2D communication device and the first other D2D communication device.

According to a further embodiment, a D2D communication device is provided. The D2D communication device is configured to receive a D2D communication message transmitted on a direct wireless link from a first other D2D communication device to a second other D2D communication device. The D2D communication message comprises at least one identifier of the first other D2D communication device. Further, the D2D communication device is configured to, based on the at least one identifier, control establishment of a direct wireless link between the D2D communication device and the first other D2D communication device.

According to a further embodiment, a D2D communication device is provided. The D2D communication device comprises at least one processor and a memory. The memory contains instructions executable by said at least one processor, whereby the D2D communication device is operative to receive a D2D communication message transmitted on a direct wireless link from a first other D2D communication device to a second other D2D communication device. The D2D communication message comprises at least one identifier of the first other D2D communication device. Further, the memory contains instructions executable by said at least one processor, whereby the D2D communication device is operative to, based on the at least one identifier, control establishment of a direct wireless link between the D2D communication device and the first other D2D communication device.

According to a further embodiment of the invention, a computer program or computer program product is provided, e.g., in the form of a non-transitory storage medium, which comprises program code to be executed by at least one processor of a D2D communication device. Execution of the program code causes the D2D communication device to receive a D2D communication message transmitted on a direct wireless link from a first other D2D communication device to a second other D2D communication device. The D2D communication message comprises at least one identifier of the first other D2D communication device. Further, execution of the program code causes the D2D communication device to, based on the at least one identifier, control establishment of a direct wireless link between the D2D communication device and the first other D2D communication device.

Details of such embodiments and further embodiments will be apparent from the following detailed description of embodiments.

DETAILED DESCRIPTION OF EMBODIMENTS

Figure 1A:
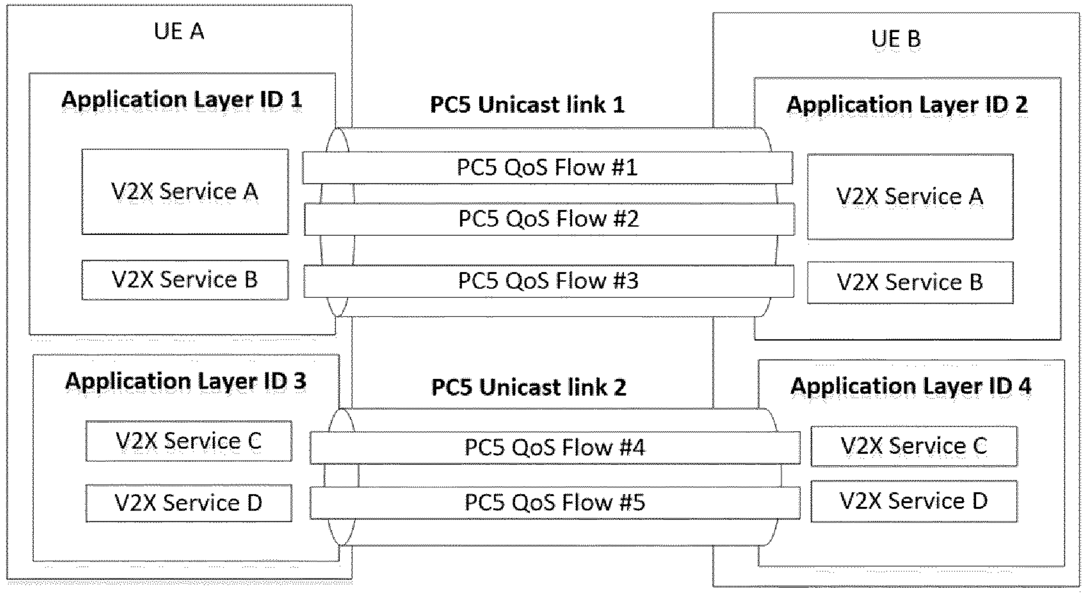
FIG. 1A schematically illustrates utilization of multiple sidelink unicast links for supporting different services.
Figure 1B:
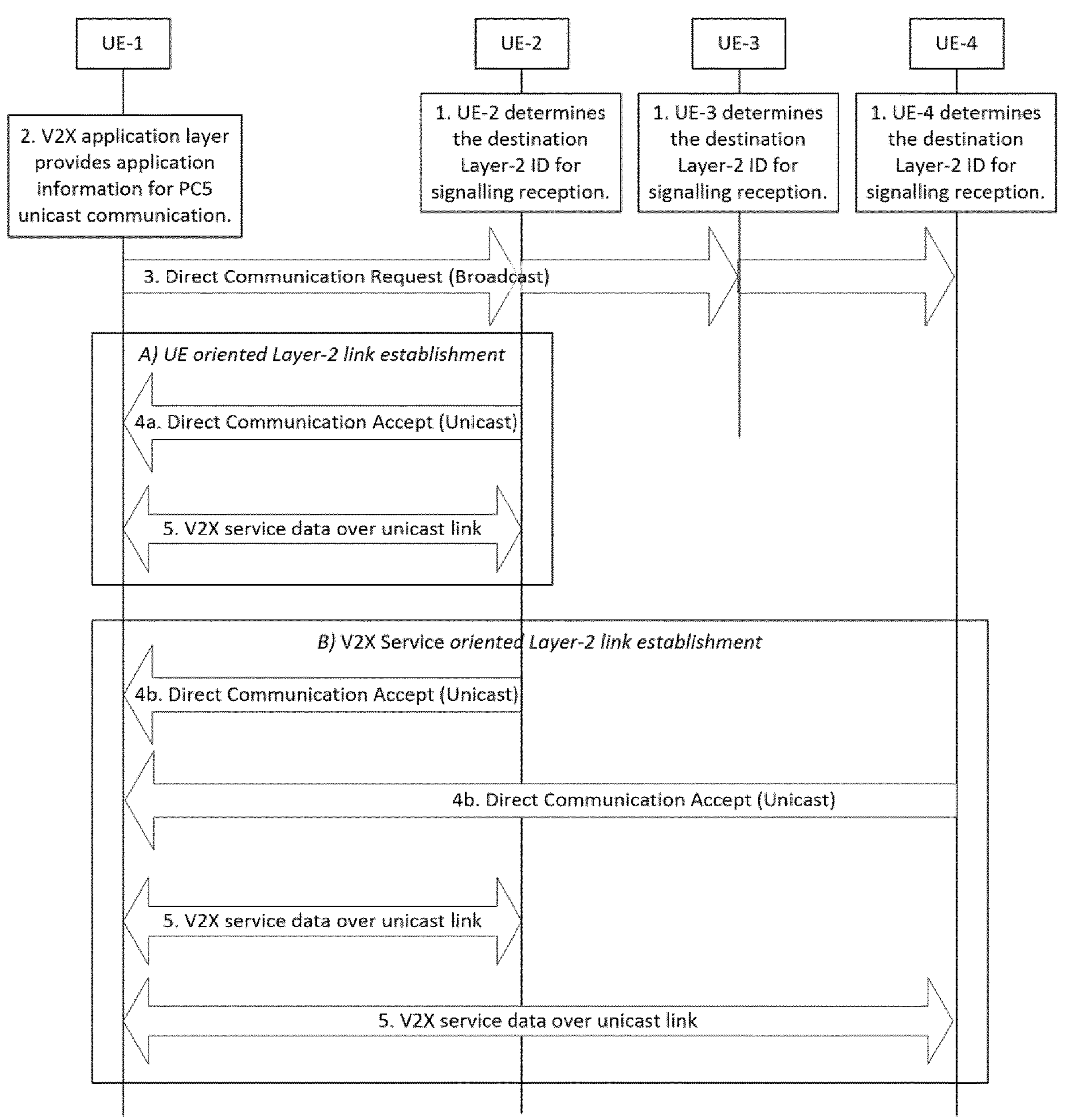
FIG. 1B schematically illustrates a direct discovery procedure for service oriented establishment of sidelink unicast links.

In the following, concepts in accordance with exemplary embodiments of the invention will be explained in more detail and with reference to the accompanying drawings. The illustrated embodiments relate to controlling of D2D communication by D2D communication devices. These D2D communication devices may include various types of WDs. As used herein, the term "wireless device" (WD) refers to a device capable, configured, arranged, and/or operable to communicate wirelessly with network nodes and/or other WDs. Unless otherwise noted, the term WD may be used interchangeably herein with UE (User Equipment). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VOIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP. However, it is noted that the illustrated concepts could also be applied to other radio technologies, e.g., a WLAN (Wireless Local Area Network) technology.

In the illustrated concepts, a D2D communication device may monitor D2D communication messages addressed to other recipients, i.e., in principle not intended to be received by the D2D communication device, and use information from such messages, in particular one or more identifiers, to control establishment of a direct wireless link. The direct wireless link may correspond to a sidelink unicast link and may be defined on the PHY and MAC protocol layers. The direct wireless link may be used as a part of a wireless connection, e.g., it may form a segment of a multi-hop wireless connection and/or it may be used as a basis for establishing a wireless connection defined on a higher protocol layer. In particular, the D2D communication device may identify that the message originates from another D2D communication device to which establishment of a direct wireless link is desirable and then establish the direct wireless link, optionally taking into account one or more additional conditions like expected quality of the direct wireless link or a position of the other D2D communication device on a multi-hop wireless connection. Based on the received D2D communication message, the WD can efficiently decide whether establishment of the direct wireless link is feasible and avoid resource consuming discovery procedures or unsuccessful connection establishment attempts.

Figure 2A:
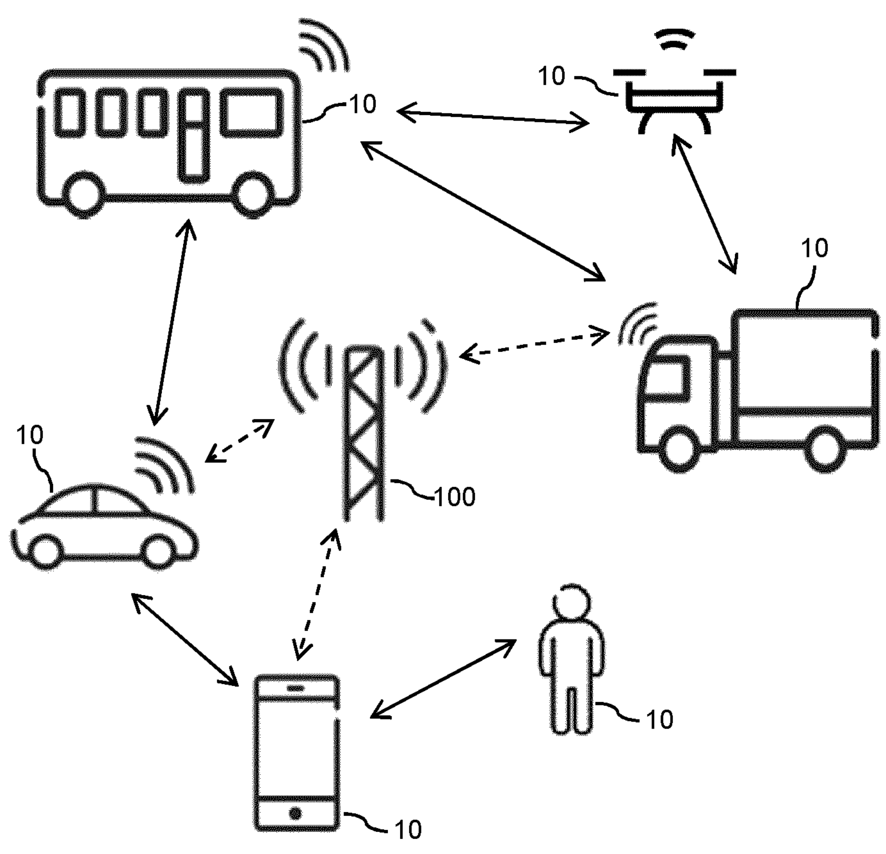
FIG. 2A schematically illustrates an exemplary V2X scenario in which D2D communication may be controlled according to an embodiment of the invention.

FIG. 2A illustrates an exemplary scenario involving V2X communications. In particular, FIG. 2A shows various UEs 10, which may engage in V2X communication or other D2D communication, illustrated by solid arrows. Further, FIG. 2A shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs illustrated in FIG. 2A comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 2A are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device.

The involved communication entities, i.e., the UEs 10, may be equipped with multiple transmit and receive antennas in order to enable V2X communications using beamformed transmissions. Accordingly, the V2X communication from a certain UE 10 may utilize multiple beams corresponding to different spatial directions. A beamforming mechanism of the UEs 10 may for example be based on an adaptive phased array beamforming technique or on a switched beam beamforming technique.

Figure 2B:
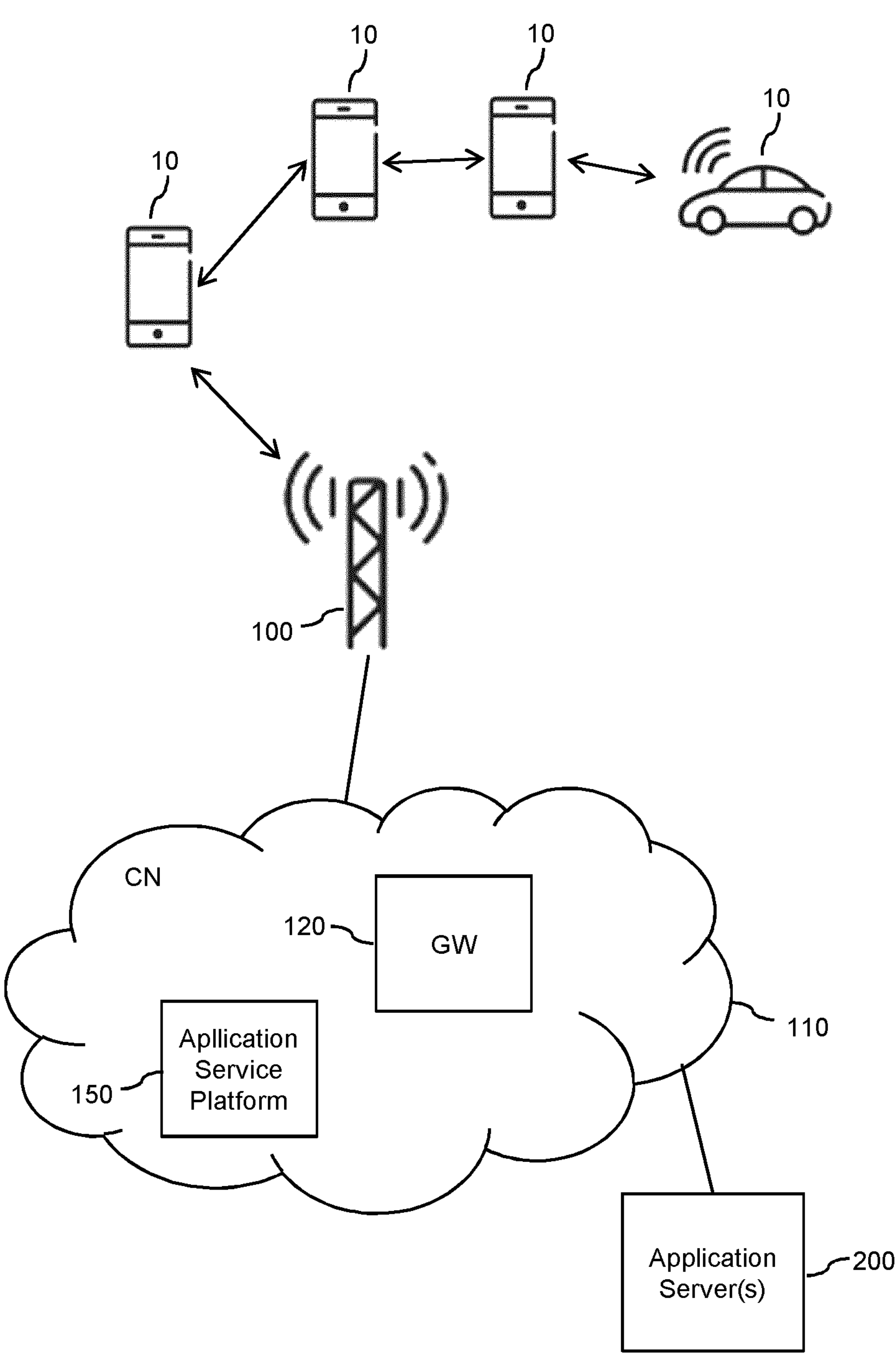
FIG. 2B schematically illustrates an exemplary scenario according to an embodiment of the invention, in which D2D communication may be controlled according to an embodiment of the invention.

FIG. 2B illustrates an exemplary D2D communication scenario. In particular, FIG. 2B shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2B shows a core network 110 of the wireless communication network. The CN 110 may provide connectivity of the UEs 10 to other data networks, e.g., through a GW 120 provided in the CN 110. Further, the CN 110 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, and/or an NSPS service. Such services may be based on applications which are executed on the UE 10 and/or on a device linked to the UE 10. Further, FIG. 2B illustrates an application service platform 150 in a core network (CN) 120 of the wireless communication network. Further, FIG. 2B illustrates one or more application servers 200 provided outside the wireless communication network. The application(s) executed on the UE 10 and/or on one or more other devices linked to the UE 10 may use the radio links with one or more other UEs 10, the application service platform 150, and/or the application server(s) 200, thereby enabling the corresponding service(s) on the UE 10. In some scenarios, the services utilized by the UEs 10 may thus be hosted on the network side, e.g., on the application service platform 150 or on the application server(s) 200. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network.

In the example of FIG. 2B, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 2A.

Figure 3:
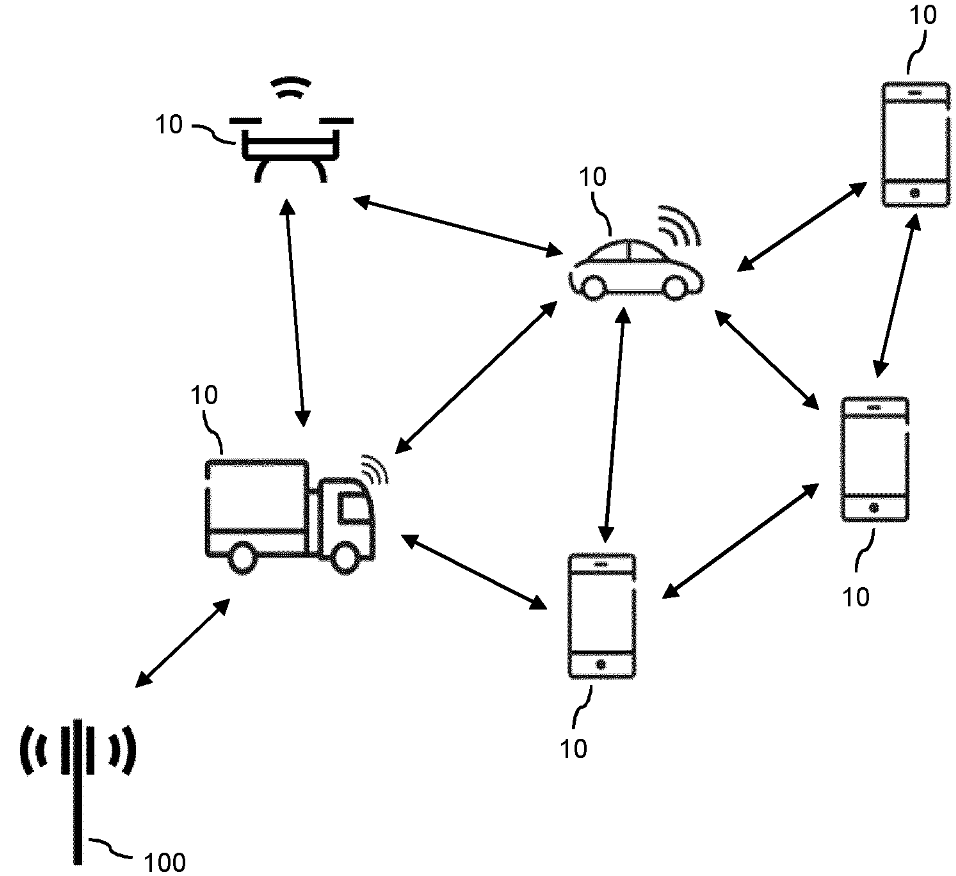
FIG. 3 schematically illustrates an exemplary NSPS communication scenario in which D2D communication may control establishment of a direct wireless link according to an embodiment of the invention.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve relaying of communication by the UEs 10, i.e., communication via a multi-hop wireless connection established between two of the UEs 10.

Figure 4A:
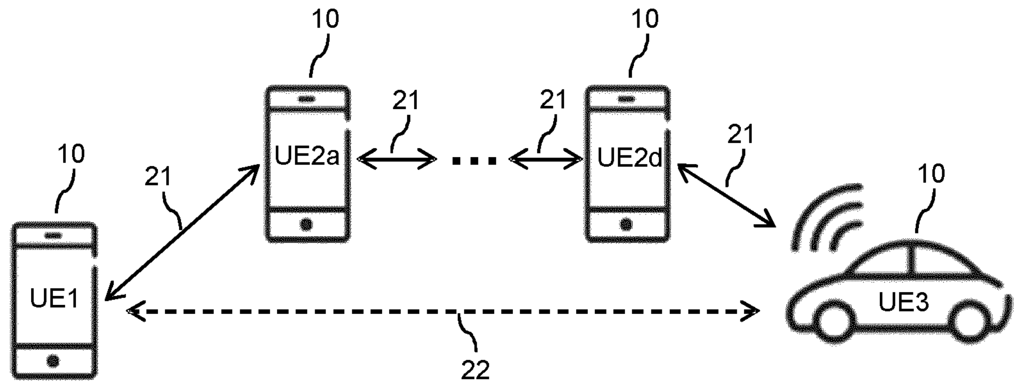
FIG. 4A schematically illustrates an exemplary scenario involving re-configuration of a multi-hop wireless connection according to an embodiment of the invention.

FIG. 4A shows an exemplary scenario for illustrating utilization of the illustrated concepts for re-configuration of a multi-hop wireless connection. The example of FIG. 4A involves multiple UEs 10, which may be in an OoC (Out of Coverage) situation. A multi-hop wireless connection is established between from a first UE 10, denoted as UE1, via multiple second UEs 10, denoted as UE2*a*, . . . , UE2*d*, to a third UE 10, denoted as UE3. The second UEs 10 may also be referred to as relay UEs. The multi-hop wireless connection is formed of multiple segments, each corresponding to a direct wireless link 21 between two of the UEs 10. Each of the segments may be regarded as corresponding to a "hop" of the multi-hop wireless connection.

When configuring the multi-hop wireless connection, e.g., at establishment or later re-configuration, the UEs 10 exchange their respective identifiers. This may be accomplished based on sidelink signaling on the direct wireless links 21. The UEs 10 may store the identifiers in configuration data of the multi-hop wireless connection, e.g., in the form of a table. Such configuration data may also be referred to as a context of the multi-hop wireless connection. The identifiers may correspond to various protocol layers and include, for each of the UEs 10 which forms a node of the multi-hop wireless connection, a physical layer (PHY) identifier (L1 ID), a MAC layer identifier (L2ID), and/or an application layer identifier (APP ID). D2D communication messages transmitted on the direct wireless links 21 for conveying data on the multi-hop wireless link typically include one or more identifiers, e.g., L1 ID, L2 ID, and/or APP ID, indicating the source of the D2D message and one or more identifiers, e.g., L1 ID, L2 ID, and/or APP ID, indicating the target of the D2D message. For example, the L1 ID may be included in SCI (Sidelink Control Information) of the D2D communication message, the L2 ID may be included in a MAC Control Element (MAC CE) of the D2D communication message, and the APP ID may be included in a MAC Protocol Data Unit (MAC PDU) of the D2D communication message.

Each of the UEs 10 may monitor the D2D communication messages received from other D2D communication devices in its proximity, in particular those messages which are targeted to other D2D communication devices. Based on the identifier(s) indicating the source of the D2D message, the UE 10 can decide whether to establish a direct wireless link to the UE 10 corresponding to the source of the D2D communication message. Specifically, the UE 10 may compare the identifier(s) from the received D2D communication message to the identifiers stored in the context of the multi-hop wireless connection, and if there is a match, identify the UE 10 corresponding to the source of the D2D communication message as being a node of the multi-hop wireless connection. The UE 10 can then decide to establish a direct wireless link to the identified UE 10 and re-configure the multi-hop wireless connection by using the established direct wireless link to bypass one or more nodes of the multi-hop wireless connection.

In the example of FIG. 4A, it is assumed that UE1 receives a D2D communication message transmitted on the direct wireless link 21 from the third UE3 to UE2*d*, identifies the source of this D2D communication message as being a node of the multi-hop wireless connection, and establishes a direct wireless link 22 from UE1 to UE3, bypassing the UEs 2*a*, . . . , UE2*d*. The decision to establish the direct wireless link 22 may also be based on additional criteria, such as expected quality of the direct wireless link 22. The expected quality of the direct wireless link 22 could for example be estimated from signal strength, e.g., in terms of RSRP (Reference Signal Received Power) of the received D2D communication message. In the example of FIG. 4A, the established direct wireless connection can thus be used to replace the entire multi-hop wireless connection. The UEs 10 may then update the context of the multi-hop wireless connection accordingly, e.g., by sending one or more update messages to neighboring nodes of the multi-hop wireless connection. Further, the direct wireless connections between UE1 and UE2*a*, the direct wireless connections between UE2*a* and UE2*d*, and the direct wireless connection between UE2*d* and UE3 may be deactivated or released. Here, it is noted that in some situations one or more of these direct wireless links could also be maintained, e.g., because they are also used by other wireless connections.

Figure 4B:
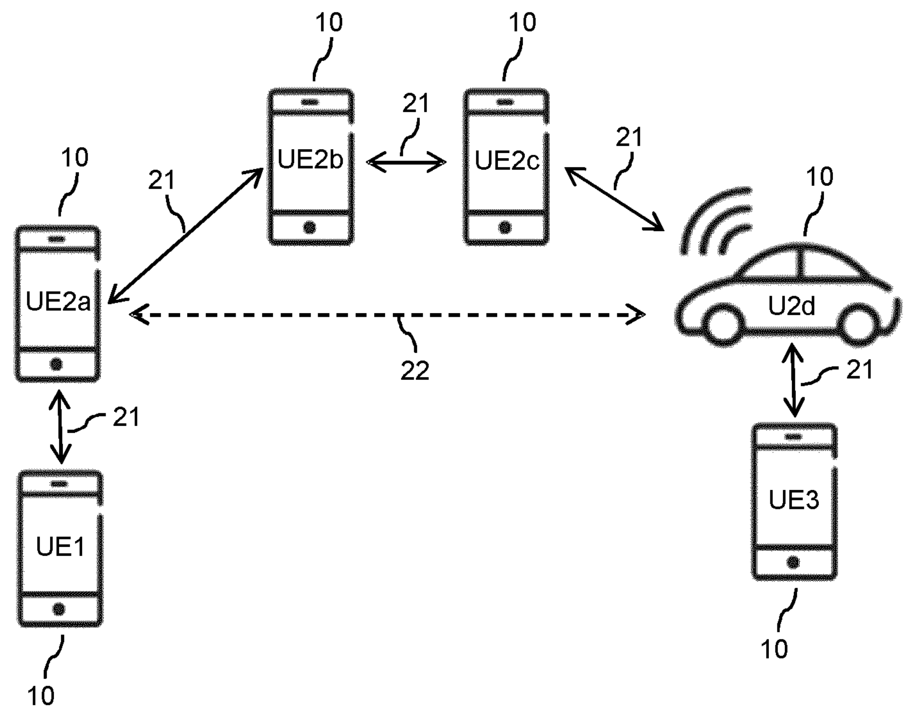
FIG. 4B schematically illustrates a further exemplary scenario involving re-configuration of a multi-hop wireless connection according to an embodiment of the invention.

FIG. 4B shows a further exemplary scenario for illustrating utilization of the illustrated concepts for re-configuration of a multi-hop wireless connection. Similar to the example of FIG. 4A, the example of FIG. 4B involves multiple UEs 10, which may be in an OoC situation. A multi-hop wireless connection is established between a first UE 10, denoted as UE1, via multiple second UEs 10, denoted as UE2*a*, . . . , UE2*d*, to a third UE 10, denoted as UE3. The second UEs 10 may also be referred to as relay UEs. The multi-hop wireless connection is formed of multiple segments, each corresponding to a direct wireless link 21 between two of the UEs 10. Each of the segments may be regarded as corresponding to a "hop" of the multi-hop wireless connection.

As mentioned above, when configuring the multi-hop wireless connection, e.g., at establishment or later re-configuration, the UEs 10 may exchange their respective identifiers, e.g., L1 ID, L2 ID, and/or APP ID, and store the identifiers in the context of the multi-hop wireless connection. Each of the UEs 10 may then monitor the D2D communication messages received from other D2D communication devices in its proximity, in particular those messages which are targeted to other D2D communication devices. Based on the identifier(s) indicating the source of the D2D message, the UE 10 can decide whether to establish a direct wireless link to the UE 10 corresponding to the source of the D2D communication message.

In the example of FIG. 4B, it is assumed that UE2*a* receives a D2D communication message transmitted on the direct wireless link 21 from UE2*d* to UE2*c*, identifies the source of this D2D communication message as being a node of the multi-hop wireless connection, and establishes a direct wireless link 22 from UE2*a* to UE2*d*, bypassing the UEs 2*a*, . . . , UE2*d*. The decision to establish the direct wireless link 22 may also be based on additional criteria, such as expected quality of the direct wireless link 22. The expected quality of the direct wireless link 22 could for example be estimated from signal strength, e.g., in terms of RSRP of the received D2D communication message. In the example of FIG. 4B, the established direct wireless connection can thus be used to replace segments of the multi-hop wireless connection. The UEs 10 may then update the context of the multi-hop wireless connection accordingly, e.g., by sending one or more update messages to neighboring nodes of the multi-hop wireless connection.

In some scenarios, one or more of the identifiers of the UEs 10 forming the nodes of the multi-hop wireless connection may change while the multi-hop wireless connection is maintained, e.g., due to the identifiers being temporary. The UEs 10 may then exchange the new identifiers and update the context of the multi-hop wireless connection accordingly. Further, the direct wireless connections between UE2*a* and UE2*b*, the direct wireless connections between UE2*b* and UE2*c*, and the direct wireless connection between UE2*c* and UE2*d* may be deactivated or released. Here, it is noted that in some situations one or more of these direct wireless links could also be maintained, e.g., because they are also used by other wireless connections.

In some scenarios, information from different protocol layers may be used in combination in the process of deciding whether to establish the direct wireless connection. For example, upon receiving a D2D communication message, the UE 10 could first decode the SCI and compare the L1 ID from the SCI to the L1 IDs stored in the context of the multi-hop wireless connection. If there is a match, the UE 10 may proceed to decode the corresponding MAC CE and/or MAC PDU. The UE 10 may then compare the L2 ID from the MAC CE or the APP ID from the MAC PDU to the L2 IDs or APP IDs, respectively, stored in the context of the multi-hop wireless connection and proceed to the establishment of the direct wireless link only if a match of L2 IDs and/or APP IDs is found. Accordingly, a full identifier of the UE 10 may be formed of a combination of at least two of the L1 ID, L2 ID, and APP ID.

In some scenarios, the reception of the D2D communication message from the other UE 10 may already implicitly indicate that sufficient quality of the direct wireless link 22 can be expected, and in response to finding the match of the identifiers, the UE 10 may immediately proceed to attempt establishing the direct wireless link 22. Alternatively, the UE 10 may attempt establishing the direct wireless link 22 if one or more additional criteria are met. Such criteria may include one or more of the following:

- A signal strength measured on the basis of the received D2D communication message is equal to or above a threshold. The signal strength could for example be measured in terms of an RSRP of a PSCCH (Physical Sidelink Control Channel) carrying the SCI or an RSRP of a PSSCH (Physical Sidelink Shared Channel) carrying the MAC CE or MAC PDU. The threshold could be preconfigured or semi-statically or dynamically configured by the wireless communication network, e.g., by a node of the wireless communication network, such as the access node 100, the GW 120, or some other node of the CN 110.
- The UE 10 has received a certain number N of D2D communication messages from the same UE, optionally within a certain time window T. The value N and/or the time window T could be preconfigured or semi-statically or dynamically configured by the wireless communication network, e.g., by a node of the wireless communication network, such as the access node 100, the GW 120, or some other node of the CN 110.
- The power supply status, e.g., in terms of battery level, of the UE 10 initiating the connection establishment is above a threshold which allows re-configuration of the multi-hop wireless connection. This threshold may also take into account the above-mentioned measured signal strength, e.g., by setting a higher threshold if the measured signal strength is low and more energy consumption can be expected for establishing and/or maintaining the direct wireless link 22.

Figure 5:
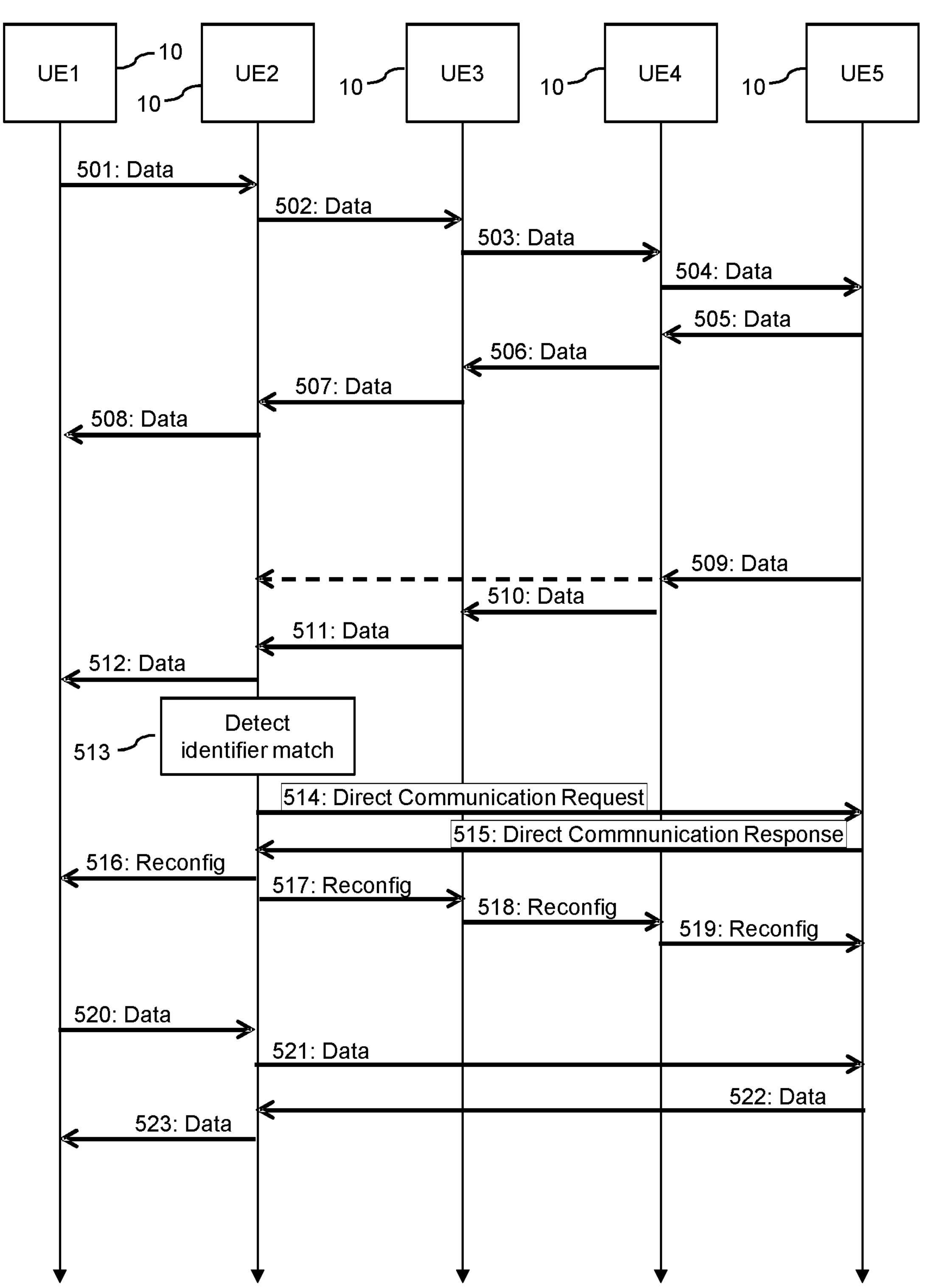
FIG. 5 shows an example of processes in which a multi-hop wireless connection is re-configured according to an embodiment of the invention.

FIG. 5 shows an example of processes which are based on the illustrated concepts. The processes of FIG. 5 involve multiple UEs 10, denoted as UE1, UE2, UE3, U4, and UE5, which may for example correspond to any of the above-mentioned UEs 10.

In the example of FIG. 5, it is assumed that a multi-hop wireless connection is established between UE1 and UE5. Each of the UEs 10 keeps a context of the multi-hop wireless connection, which includes one or more identifiers of each node in the path of the multi-hop wireless connection. The identifiers may include an L1 ID, an L2 ID, and/or an APP ID of the respective UE. In addition, the context data may also include further information on the multi-hop wireless connection, e.g., a position of the respective UE 10 within the multi-hop wireless connection, e.g., in terms of a number of hops from one of the endpoints of the multi-hop wireless connection, i.e., from UE1 or from UE5.

In addition to monitoring the D2D communication messages received from neighboring nodes of the multi-hop wireless connection, each UE 10 also monitors D2D communication messages received from other UEs 10. Such other UEs may be UEs 10 on the path of the multi-hop wireless connection or UEs 10 outside the path of the multi-hop wireless connection.

The multi-hop wireless connection extends via UE2, UE3, and UE4, which act as relay nodes. Accordingly, when UE1 transmits data on the multi-hop wireless connection, UE1 sends the data in a D2D communication message 501 to UE2, UE2 forwards the data in a D2D communication message 502 to UE3, UE3 forwards the data in a D2D communication message 503 to UE4, and UE4 forwards the data in a D2D communication message 504 to UE5. Similarly, when UE5 transmits data on the multi-hop wireless connection, UE5 sends the data in a D2D communication message 505 to UE4, UE4 forwards the data in a D2D communication message 506 to UE3, UE3 forwards the data in a D2D communication message 507 to UE2, and UE2 forwards the data in a D2D communication message 508 to UE1.

In the example of FIG. 5 it is assumed that at some point, UE5 transmits data on the multi-hop wireless connection and sends the data in a D2D communication message 509 to UE4. As above, UE4 forwards the data in a D2D communication message 510 to UE3, UE3 forwards the data in a D2D communication message 511 to UE2, and UE2 forwards the data in a D2D communication message 512 to UE1. Due to mobility of the UEs 10 and/or otherwise changed conditions, the D2D communication message 509 is also received by UE2 (as indicated by a broken arrow).

As indicated by block 513, UE2 then detects a match of one or more identifiers in the D2D communication message 509 and the identifiers stored in the context of the multi-hop wireless connection. As a result, UE2 proceeds to attempt establishment of a direct wireless link to UE5. In the illustrated example this involves broadcasting a Direct Link Setup Request 514 including at least one of the identifiers of UE5. UE5 may then confirm establishment of the direct wireless link by sending a Direct Communication Response 515.

Upon successful establishment of the direct wireless link, UE2 then initiates reconfiguration of the multi-hop wireless connection by providing corresponding reconfiguration information to the other nodes of the multi-hop wireless connection. In the illustrated example, this involves sending Reconfiguration messages 516, 517 to its neighboring nodes, i.e., to UE1 and UE3, and successively forwarding the information to the next hop node. In the illustrated example, this involves that UE3 forwards the reconfiguration information by sending a Reconfiguration message 518 to UE4, and that UE4 forwards the reconfiguration information by sending a Reconfiguration message 519 to UE5. The reconfiguration information causes the UEs 10 to update their context of the multi-hop wireless connection, e.g., by updating the stored identifiers. Further, the reconfiguration information causes some of the UEs 10 to release or at least deactivate no longer required direct wireless links. In the illustrated example, the direct wireless link between UE2 and U3, the direct wireless link between UE3 and UE4, and the direct wireless link between UE4 and UE5 may be released or at least deactivated.

After the reconfiguration of the multi-hop wireless connection, data can be conveyed via shortened path. As illustrated this may involve that when UE1 transmits data on the re-configured multi-hop wireless connection, UE1 sends the data in a D2D communication message 520 to UE2, and UE2 forwards the data in a D2D communication message 521 to UE5. Similarly, when UE5 transmits data on the re-configured multi-hop wireless connection, UE5 sends the data in a D2D communication message 522 to UE2, and UE4 forwards the data in a D2D communication message 506 to UE3, UE3 forwards the data in a D2D communication message 523 to UE1.

As mentioned above, in some scenarios direct wireless links which are no longer required due to re-configuration of the multi-hop wireless connection may be deactivated rather than completely released. In such scenarios, recovery of the multi-hop wireless connection after a failure of a direct wireless link on one of its segments may be facilitated. In particular, the deactivated direct wireless links could be re-activated to replace the failed segment. The information concerning activation or deactivation of the direct wireless links may be stored in the context of the multi-hop wireless connection, e.g., in terms of a flag or other indicator associated with the respective UE 10. In some scenarios, direct wireless links may first be deactivated and then be released, e.g., after expiry of a timer started upon deactivation.

In the example of FIG. 5, recovery of the multi-hop wireless connection could be implemented as follows: Upon re-configuration of the multi-hop wireless connection by messages 516, 517, 518, 519, each UE 10 updates its context of the multi-hop wireless connection by marking UE3 and UE4 as inactive. This implies that also the direct wireless links to these UEs 10 are inactive. When updating the context, each UE 10 starts a timer, and upon expiry of the timer, UE3 and UE4 would be deleted from the context of the multi-hop wireless connection, and the direct wireless link between UE2 and UE3, the direct wireless link between UE3 and UE4, and the direct wireless link between UE4 and UE5 released. However, if the direct wireless link between UE2 and UE5 fails before expiry of the timer, the multi-hop wireless connection can be recovered by re-activating UE3 and UE4 in the context of the multi-hop wireless connection. This updating of the context may involve sending corresponding reconfiguration information to the UEs 10, e.g., in a similar manner as explained for the Reconfiguration messages 516, 517, 518, and 519. Accordingly, the reconfiguration information may also be sent via currently deactivated direct wireless links.

Figure 6:
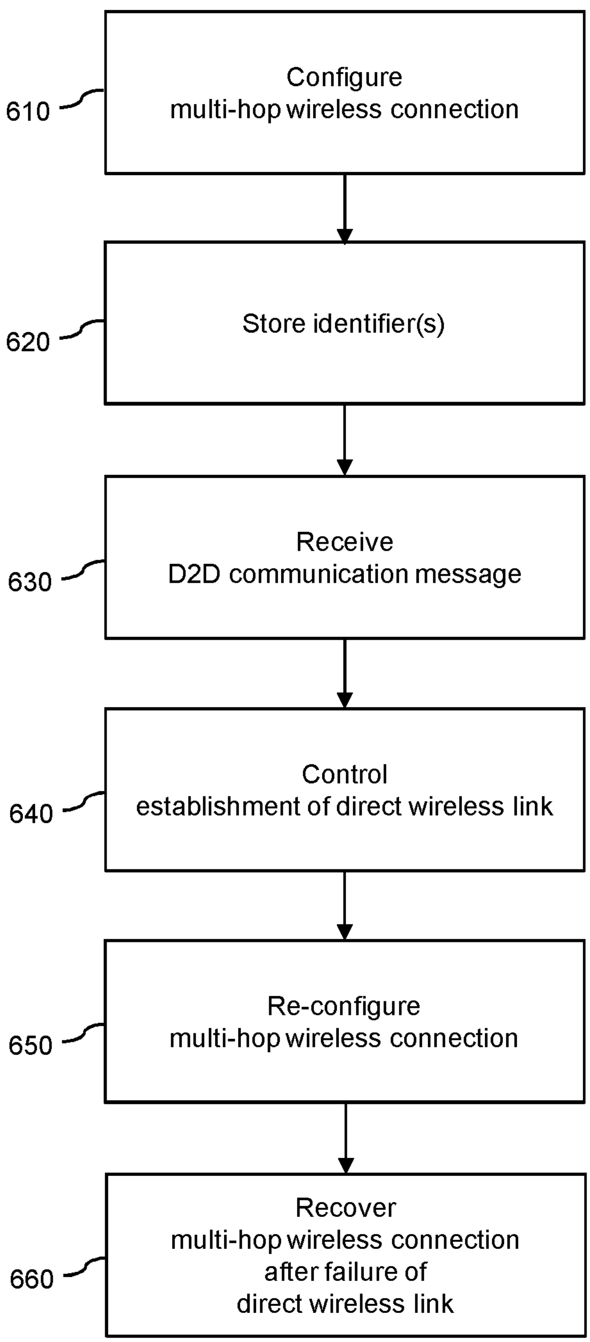
FIG. 6 shows a flowchart for schematically illustrating a method performed by a D2D communication device operating according to an embodiment of the invention.

FIG. 6 shows a flowchart for illustrating a method, which may be utilized for implementing the illustrated concepts. The method of FIG. 6 may be used for implementing the illustrated concepts in a D2D communication device, e.g., corresponding to any of the above-mentioned UEs 10, 11, 12, 13, 14, 15. In some scenarios, the D2D device may be a vehicle or vehicle-mounted device, but other types of WD, e.g., as mentioned above, could be used as well.

If a processor-based implementation of the D2D communication device is used, at least some of the steps of the method of FIG. 6 may be performed and/or controlled by one or more processors of the D2D communication device. Such D2D communication device may also include a memory storing program code for implementing at least some of the below described functionalities or steps of the method of FIG. 6.

At step 610, the D2D communication device may configure a multi-hop wireless connection. As mentioned above, the multi-hop wireless connection may be formed of multiple segments, each corresponding to a direct wireless link between two D2D communication devices and defining a hop of the multi-hop wireless connection. The communication device may be a node of the multi-hop wireless connection, e.g., an endpoint or a relay node which forwards data between endpoints of the multi-hop wireless connection.

In some scenarios, step 610 may involve that the D2D communication device stores configuration data of the multi-hop wireless connection. The configuration data may include identifiers of nodes of the multi-hop wireless connection.

In some scenarios, step 610 may involve that the D2D communication device sends at least one D2D communication message indicating at least one identifier of the D2D communication device. In addition or as an alternative, the D2D communication device may send at least one D2D communication message indicating at least one identifier of at least one other D2D communication device (10; 700 800) which forms a node of the multi-hop wireless connection. Accordingly, the D2D communication device may participate in distributing information concerning the identifiers of the nodes of the multi-hop wireless connection among the nodes of the multi-hop-wireless connection. The D2D communication device may send the at least one D2D communication message indicating the at least one identifier during establishment or re-configuration of the multi-hop wireless connection, e.g., in any of the above-mentioned messages 516, 517, 518, 519.

At step 620, the D2D communication device may store identifiers of other D2D communication devices. In some scenarios, the identifiers may correspond to identifiers of nodes of the multi-hop wireless connection configured at step 610.

In some scenarios, the D2D communication device may receive information for configuration of the multi-hop wireless connection, e.g., during establishment or re-configuration of the multi-hop wireless connection configured at step 610. For example, the D2D communication device could receive the information in any of the above-mentioned messages 516, 517, 518, 519. The D2D communication device may store the identifiers based on the received information.

In some scenarios, the D2D communication device may receive at least one D2D communication message on the multi-hop wireless connection, e.g., a message used to convey data between the endpoints of the multi-hop wireless connection, such as any of the above-mentioned messages 501, 502, 503, 504, 505, 506, 507, 508, 509, 510, 511, 512, 516, 517, 518, 519, 50, 52, 522, 523, and store the identifiers based on information from the at least one further D2D communication message. In particular, the at least one D2D communication message received on the multi-hop wireless connection may indicate the identifiers of at least some of the other nodes of the multi-hop wireless connection and/or updates of at least some of the other nodes of the multi-hop wireless connection. In some scenario, the stored identifiers may also be identifiers of one or more other D2D communication devices corresponding to earlier communication peers in an NSPS scenario, e.g., group peers to which communication was lost.

The stored identifiers may include a PHY identifier, such as the above-mentioned L1 ID. Alternatively or in addition, the stored identifiers may include a MAC layer identifier, such as the above-mentioned L2 ID. Alternatively or in addition, the stored identifiers may include an application layer identifier, such as the above-mentioned APP ID.

At step 630, the D2D communication device receives a D2D communication message. The D2D communication message is transmitted on a direct wireless link from a first other D2D communication device to a second other D2D communication device. The D2D communication message includes at least one identifier of the first other D2D communication device. At least the D2D communication device and the first other D2D communication device may be nodes of a multi-hop wireless connection. In some scenarios, also the second other D2D communication device may be a node of the multi-hop wireless connection. The above-mentioned D2D communication message 509 as received by UE2 is an example of the D2D communication message received at step 630.

The at least one identifier from the received D2D communication message may include a PHY identifier, such as the above-mentioned L1 ID. Alternatively or in addition, the at least one identifier from the received D2D communication message may include an MAC layer identifier, such as the above-mentioned L2 ID. Alternatively or in addition, the at least one identifier from the received D2D communication message may include an application layer identifier, such as the above-mentioned APP ID.

In some scenarios, the received D2D communication message may include SCI. In this case, the at least one identifier may include a PHY identifier indicated by the SCI, such as the above-mentioned L1 ID. Alternatively or in addition, the received D2D communication message may include an MAC CE. In this case, the at least one identifier may include an MAC layer identifier indicated by the MAC CE, such as the above-mentioned L2 ID. Alternatively or in addition, the received D2D communication message may include an MAC PDU. In this case, the at least one identifier may include an application layer identifier indicated by the MAC PDU, such as the above-mentioned APP ID.

At step 640, the D2D communication device controls establishment of a direct wireless link between the D2D communication device and the first other D2D communication device. This is accomplished based on the at least one identifier from the D2D communication message received at step 630.

In some scenarios, step 640 may involve that the D2D communication device compares the at least one identifier from the received D2D communication message to stored identifiers, e.g., to the identifiers stored at step 610. Based on the comparison, the D2D communication device may then control the establishment of the direct wireless link between the D2D communication device and the first other D2D communication device. For example, the D2D communication device could initiate establishment of the direct wireless link in response to the at least one identifier from the received D2D communication message matching one of the stored identifiers, which corresponds to the first other D2D communication device In some scenarios, the D2D communication device may control the establishment of the direct wireless link further based on an estimated quality of the direct wireless link, e.g., based on a signal strength measured on the D2D communication message received at step 630.

In some scenarios, the D2D communication device may control the establishment of the direct wireless link further based on a number of D2D communication messages which are transmitted on one or more direct wireless links from the first other D2D communication device to other D2D communication devices, include the identifier, and are received by the D2D communication device. Optionally this number may be evaluated in relation to time, e.g., as a number of D2D communication messages received within a certain time window.

In some scenarios, the D2D communication device may control the establishment of the direct wireless link further based on a power supply status of the D2D communication device.

At step 650, the D2D communication device may re-configure the multi-hop wireless connection. Step 650 may involve that in response to the at least one identifier from the received D2D communication message matching one of the stored identifiers which corresponds to the first other D2D communication device, the D2D communication device identifies the first other D2D communication device as node of the multi-hop wireless connection, establishes the direct wireless link to the first other D2D communication device, and re-configures the multi-hop wireless connection based on the established direct wireless link.

In some scenarios, there may be a situation where the D2D communication device receives multiple D2D communication messages, each including at least one identifier of another D2D communication device transmitting the respective D2D communication message, and the identifiers from two or more of the received D2D communication messages match two or more of the stored identifiers. In this case, the D2D communication device may identify multiple nodes of the multi-hop wireless connection as sources of the two or more D2D communication messages. The D2D communication device may then perform a selection to which other D2D communication device the direct wireless link should be established, i.e., a selection of the first other D2D communication. device This selection may be based on various criteria.

For example, the selection may be based on a respective number of hops on the multi-hop wireless connection from the D2D communication device to each of the identified multiple nodes. The selection could then prioritize selection of the node with the highest number of hops, so that the multi-hop wireless connection can be shortened as far as possible.

Alternatively or in addition, the selection may be based on a respective estimated quality of a direct wireless link from the D2D communication device to each of the identified multiple nodes. The selection could then prioritize selection of the node with the highest estimated quality, so that reliability of the newly established direct wireless link can be maximized.

In some scenarios, step 650 may involve that the D2D communication device notifies one or more other nodes of the multi-hop wireless connection about the establishment of the direct wireless link to the first other D2D communication device, such as by any of the above-mentioned messages 516, 517, 518, 519.

The re-configuration of the multi-hop wireless connection at step 650 may involve bypassing one or more nodes of the multi-hop wireless connection by the direct wireless link. In some scenarios, the D2D communication device starting may start a timer in response to bypassing the one or more nodes. Upon expiry of the timer, the D2D communication device may delete the identifier of the one or more bypassed nodes from the configuration data of the multi-hop wireless connection. Before expiry of the timer, the one or more bypassed nodes may be declared as deactivated, e.g., by a corresponding marking in the configuration data. In response to a failure of the direct wireless link, the D2D communication device may then recover the multi-hop wireless connection based on a direct wireless link between the D2D communication device and one of the one or more bypassed nodes, as indicated by step 660.

Figure 7:
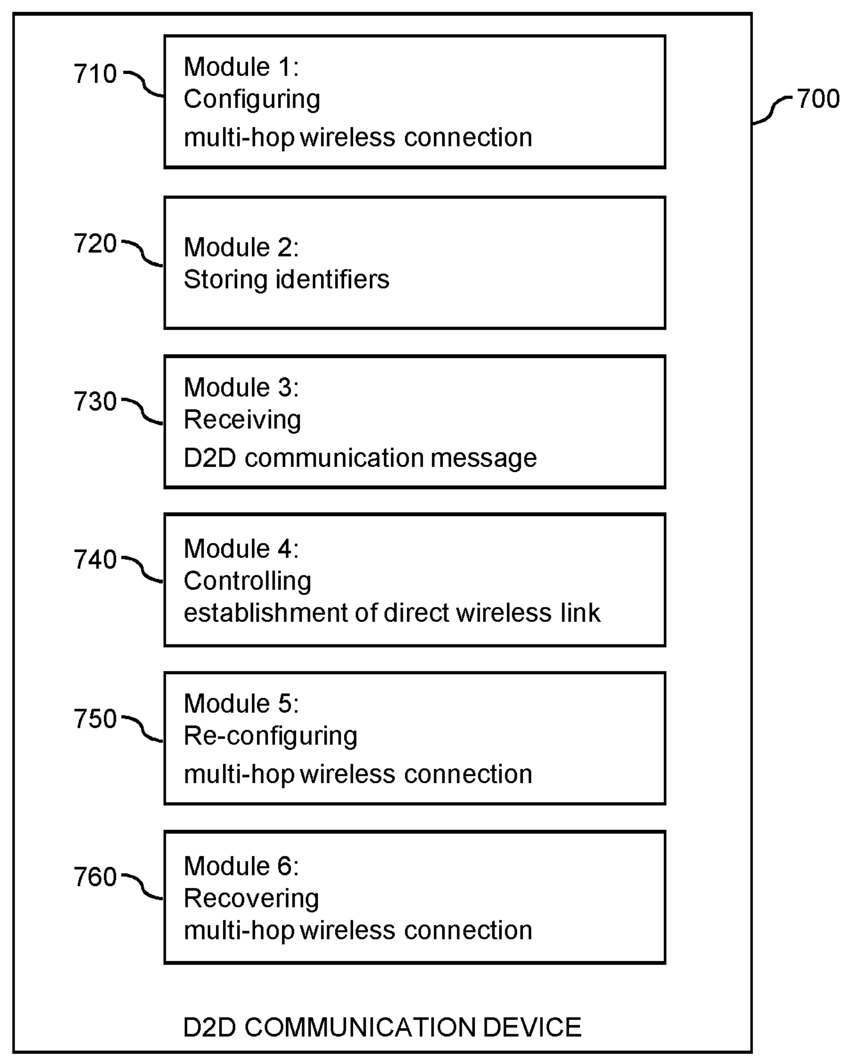
FIG. 7 shows an exemplary block diagram for illustrating functionalities of a D2D communication device implementing functionalities corresponding to the method of FIG. 6.

FIG. 7 shows a block diagram for illustrating functionalities of a D2D communication device 700 which operates according to the method of FIG. 6. The D2D communication device 700 may for example correspond to any of the above-mentioned UEs 10. As illustrated, the D2D communication device 700 may be provided with a module 710 configured to configure a multi-hop wireless connection, such as explained in connection with step 610. Further, the D2D communication device 700 device may be provided with a module 720 configured to store identifiers of other D2D communication devices, such as explained in connection with step 620. Further, the D2D communication device 700 may be provided with a module 730 configured to receive a D2D communication message, such as explained in connection with step 630. Further, the D2D communication device 700 may be provided with a module 740 configured to establish a direct wireless link, such as explained in connection with step 640. Further, the D2D communication device 700 may be provided with a module 750 configured to re-configure a multi-hop wireless connection, such as explained in connection with step 650. Further, the D2D communication device 700 may be provided with a module 760 configured to recover a multi-hop wireless connection, such as explained in connection with step 660.

It is noted that the D2D communication device 700 may include further modules for implementing other functionalities, such as known functionalities of a UE in the LTE and/or NR radio technology. Further, it is noted that the modules of the D2D communication device 700 do not necessarily represent a hardware structure of the D2D communication device 700, but may also correspond to functional elements, e.g., implemented by hardware, software, or a combination thereof.

Figure 8:
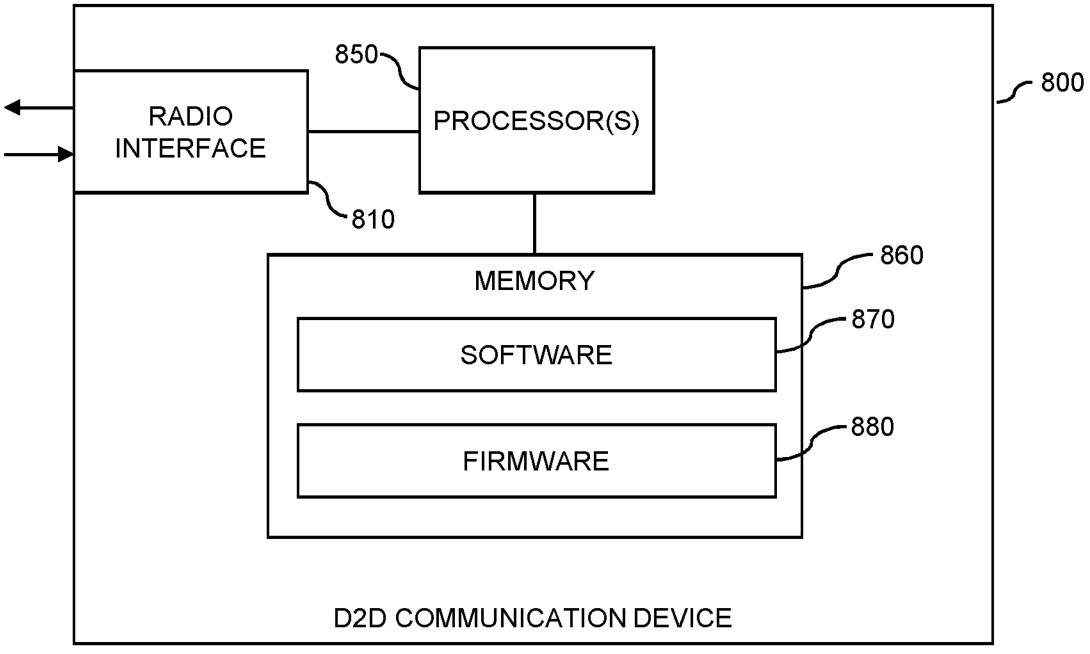
FIG. 8 schematically illustrates structures of a D2D communication device according to an embodiment of the invention.

FIG. 8 illustrates a processor-based implementation of a D2D communication device 800 which may be used for implementing the above-described concepts. For example, the structures as illustrated in FIG. 8 may be used for implementing the concepts in any of the above-mentioned UEs 10.

As illustrated, the D2D communication device 800 includes one or more radio interfaces 810. The radio interface(s) 810 may for example be based on the NR technology or the LTE technology. The radio interface(s) 810 may support D2D communication, e.g., using sidelink communication as specified for the NR technology or the LTE technology.

Further, the D2D communication device 800 may include one or more processors 850 coupled to the radio interface(s) 810 and a memory 860 coupled to the processor(s) 850. By way of example, the radio interface(s) 810, the processor(s) 850, and the memory 860 could be coupled by one or more internal bus systems of the D2D communication device 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 1070 and/or firmware 1080. The memory 860 may include suitably configured program code to be executed by the processor(s) 850 so as to implement the above-described functionalities for controlling D2D communication, such as explained in connection with FIGS. 6 and 7.

It is to be understood that the structures as illustrated in FIG. 8 are merely schematic and that the D2D communication device 800 may actually include further components which, for the sake of clarity, have not been illustrated, e.g., further interfaces, such as a dedicated management interface, or further processors. Also, it is to be understood that the memory 860 may include further program code for implementing known functionalities of a UE. According to some embodiments, also a computer program may be provided for implementing functionalities of the D2D communication device 800, e.g., in the form of a physical medium storing the program code and/or other data to be stored in the memory 860 or by making the program code available for download or by streaming.

As can be seen, the concepts as described above may be used for efficiently managing establishment of direct wireless links in D2D communication. In particular, the concepts may provide a trigger-based link establishment mechanism, as opposed to periodic broadcast messages of conventional direct discovery mechanisms. This may help to reduces the signaling load related to establishment of direct wireless links, in particular in OoC scenarios where network assistance is not available. Further, establishment of the direct wireless connection may be triggered when there is a high probability of successful link establishment, which may also help to avoid excessive signaling load and power consumption.

It is to be understood that the examples and embodiments as explained above are merely illustrative and susceptible to various modifications. For example, the illustrated concepts may be applied in connection with various kinds of radio technologies, without limitation to the LTE technology or NR technology, e.g., in connection with WLAN technologies. Further, the concepts may be applied with respect to various types of UEs, without limitation to vehicle-based UEs. Further, the concepts may be applied in connection with various services supported by D2D communication, without limitation to V2X or NSPS services. Further, the concepts may be applied to various protocol layer, without limitation to PHY, MAC, or application layer, e.g., to the IP (Internet Protocol) layer or PDCP (Packet Data Convergence Protocol)/Adaptation layer, and utilize identifiers provided by these protocol layers to identify the UEs. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless device-to-device (D2D) communication, the method performed by a D2D communication device operating as one node among a plurality of D2D communication devices operating as respective nodes in a path of a multi-hop wireless connection, the method comprising the one node:

receiving a D2D communication message transmitted on a direct wireless link from a first other node in the path to a second other node in the path, the D2D communication message being addressed to the second other node and containing an identifier of the first other node and wherein the second other node operates in the path as a relay between the one node and the first other node;

determining that there is an opportunity to establish a direct wireless link with the first other node and thereby bypass the second other node, by recognizing that the first other node is in the path, based on comparing the identifier of the first other node with a context of the wireless multi-hop connection stored in the one node, the stored context including an identifier of each node in the path; and responsive to the determination, establishing a direct wireless link between the one node and the first other node, and after establishment of the direct wireless link, reconfiguring the multi-hop wireless connection to bypass the second other node by updating the stored context of the multi-hop wireless connection;

wherein reconfiguring the multi-hop wireless connection comprises deactivating, without releasing, at least one direct wireless link associated with the second other node, such that the deactivated direct wireless link is maintained for potential re-activation.

2. The method according to claim 1, wherein determining that there is the opportunity to establish the direct wireless link with the first other node further comprises, in addition to determining that the first other node is in the path, determining that an expected quality of the direct wireless link with the first other node is sufficient, the expected quality estimated from a signal strength of the received D2D communication message.

3. The method according to claim 1, comprising:

in response to bypassing the second other node, the one node starting a timer; and upon expiry of the timer, the one node deleting the identifier of the second other node from the stored context.

4. The method according to claim 1, comprising, in response to a failure of the direct wireless link with the first other node, the one node reconfiguring the multi-hop wireless connection to include the second other node, for relaying to and from the first other node.

5. A device-to-device (D2D) communication device, the D2D communication device comprising:

a memory storing computer program instructions; and a processor that, based on execution of the computer program instructions, is configured to control the D2D communication device to operate as one node among a plurality of D2D communication devices operating as respective nodes in a path of a multi-hop wireless connection, the one node configured to:

receive a D2D communication message transmitted on a direct wireless link from a first other node in the path to a second other node in the path, the D2D communication message being addressed to the second other node and containing an identifier of the first other node and wherein the second other node operates in the path as a relay between the one node and the first other node;

determine that there is an opportunity to establish a direct wireless link with the first other node and thereby bypass the second other node, by recognizing that the first other node is in the path, based on comparing the identifier of the first other node with a context of the wireless multi-hop connection stored in the one node, the stored context including an identifier of each node in the path; and responsive to the determination, establish a direct wireless link between the one node and the first other node, and after establishment of the direct wireless link, reconfigure the multi-hop wireless connection to bypass the second other node by updating the stored context of the multi-hop wireless connection;

wherein the processor is configured to reconfigure the multi-hop wireless connection by deactivating, without releasing, at least one direct wireless link associated with the second other node, such that the deactivated direct wireless link is maintained for potential re-activation.

* * * * *